March 20, 1934.                J. F. WALSH                1,951,853
PROCESS OF PRODUCING SHEETS OF CELLULOSIC PLASTIC
Filed Feb. 26, 1929          2 Sheets—Sheet 1
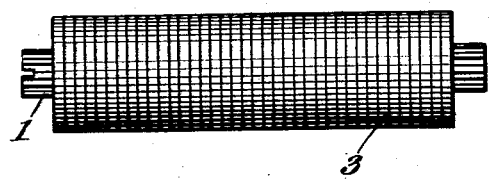
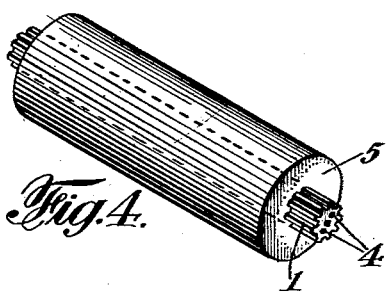
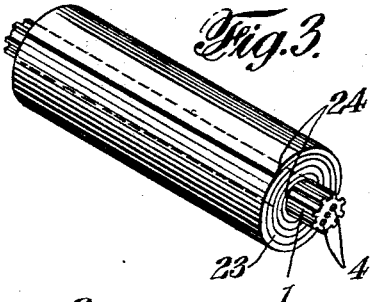
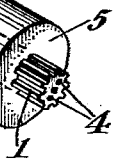
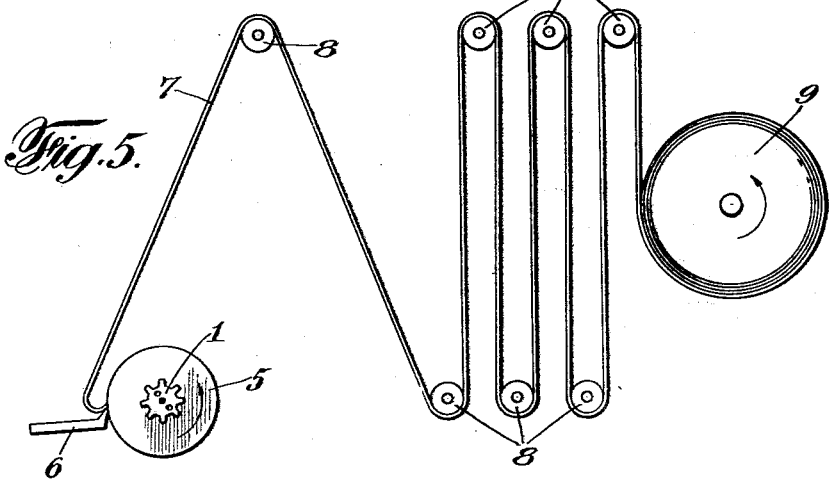
INVENTOR
James F Walsh
BY Hugo G Kemmen
ATTORNEY March 20, 1934. J. F. WALSH 1,951,853
PROCESS OF PRODUCING SHEETS OF CELLULOSIC PLASTIC
Filed Feb. 26, 1929 2 Sheets-Sheet 2
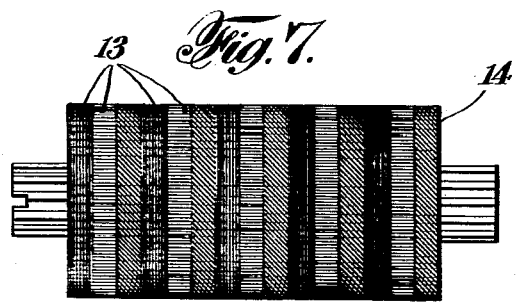
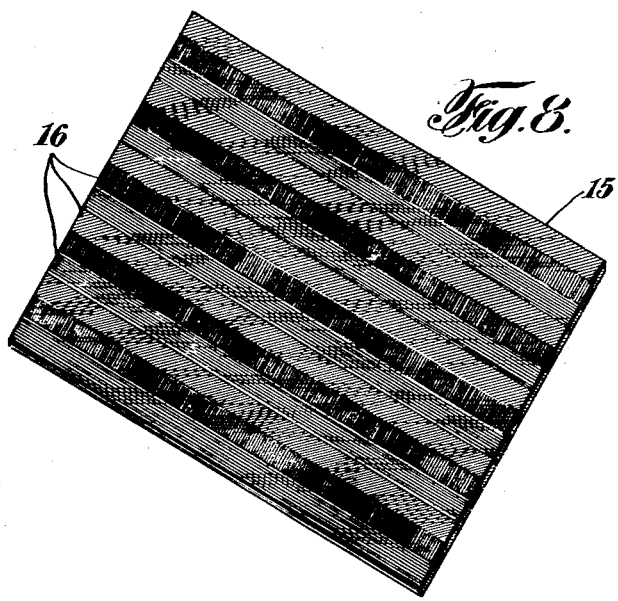
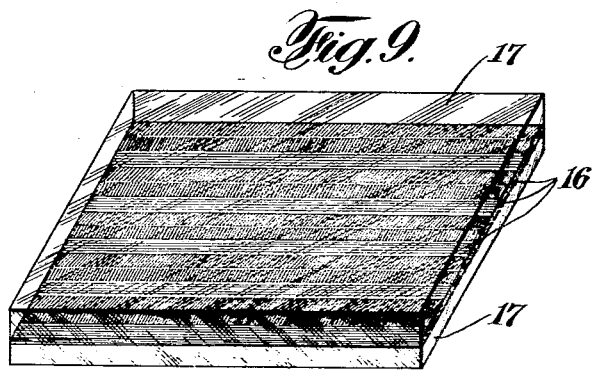
INVENTOR
James F Walsh
BY Hugo G Kemman
ATTORNEY Patented Mar. 20, 1934

1,951,853

UNITED STATES PATENT OFFICE 1,951,853

PROCESS OF PRODUCING SHEETS OF CELLULOSIC PLASTIC

James F. Walsh, South Orange, N. J., assignor to Celluloid Corporation, a corporation of New Jersey Application February 26, 1929, Serial No. 342,715

8 Claims. (Cl. 18—57)

This invention relates to non-shatterable safety glass and has for its general objects the provision of a new and improved layer or sheet to be incorporated in the glass as well as a process for producing laminated glass. The invention, also, includes the product of the novel process.

The present method of making laminated glass involves inserting sheets of cut or planed cellulosic plastic between panes or plates of glass and then causing the union of such elements into a composite mass by the aid of heat and pressure. The cohesion of parts is facilitated by the aid of a cement of an appropriate character, for example, a thin layer of gelatin fusible by heat.

Up to the time of the present invention, the cellulosic plastic sheets so used have been made by block-pressing the plastic into rectangular form and cutting the desired sheets from such block by the operation of a planing machine, the block and its cut sections being flat or level.

The manufacture of laminated glass by the means described has been fraught with many difficulties, chief among which has been a local spread or flow of the cellulosic plastic with consequent disturbance of transparency, sometimes manifested as a sort of halation. There has been a tendency to separation of the components or a "giving way" in places, which of course produces visible flaws or feathers even more hurtful to the free transmission of light.

I find that much of this opposition to the production of clearness and continuity of structure has been due to variations of thickness in the planed sheet, regardless of whether it has a base of pyroxylin or other organic derivative of cellulose. The shrinkage or other changes in the plastic block during the planing operation, especially during the waiting times or between cuts, and the variable pressure of the block on the planer knife edge at different points in the cutting also tend to produce inequalities which have much to do with the difficulties mentioned.

I, therefore, have turned to cellulosic plastic sheets produced by other methods than those of the rectangular block and its usual planings and have been successful in doing away with the impediments to manufacture just mentioned or at least in making it possible to modify them and reduce the rejects and seconds to a very low minimum.

This has been accomplished by replacing the ordinary planed sheet with a sheet made by cutting from a mandrel—that is by the lathe method.

At the start of the process the cellulosic plastic is preferably evaporated down to a stiffness more rigid than that demanded when operating with the block and planer process. The roll-made crude sheets may be wrapped around the spindle on which they are molded, or they may be formed into discs of equal size. The discs are slid along the spindle until a compact mass of assembled discs is made. The mass in either case, is then subjected to heat and pressure by any method known in the art with the result of forming a solid cylinder attached to the spindle. The length of such cylinder and consequently the width of sheet turned from it by a cutting knife is thus made variable and dependent merely on the width of the sheets wrapped around the mandrel or on the number and thickness of the discs, as the case may be. This is particularly advantageous in glass making, inasmuch as any variable demand for sheet widths can thus be met, dependent only upon the capacity of the particular mandrel apparatus available. The disc made cylinder also readily adapts itself to the formation of various colored striations and other decorative effects in the cut sheet. Laminated glass made with such sheets has many uses such as for table tops, trays, etc. where transparency is not essential and decorative effects highly desirable.

In the drawings:

Figure 1 is a perspective view of a mandrel with a disc of plastic material thereon.

Figure 2 is an elevation illustrating a plurality of discs of plastic material arranged on a mandrel.

Figure 3 is a perspective view illustrating a sheet of plastic material wrapped around a mandrel.

Figure 4 is a perspective view of a cylindrical mass formed from the discs shown in Figure 2, or from a sheet or sheets wrapped around a mandrel such as shown in Figure 3.

Figure 5 is a diagrammatical elevation illustrating apparatus for carrying out the process.

Figure 6 is a perspective view of a composited laminated structure.

Figure 7 is an elevation of a cylinder wherein discs of a plurality of colors are incorporated.

Figure 8 is a perspective view of a sheet cut from the cylinder shown in Figure 7.

Figure 9 is a perspective view of a laminated structure made with a sheet as shown in Figure 8.

The mandrel may be of any structure suitable for my purposes and preferably with grooves or other means 2 on its surface to assist in binding the plastic to the mandrel. When a full sheet or sheets are used, same are merely wrapped about the mandrel as shown in Figure 3. Otherwise, discs 3, having openings at their centers, are arranged on the mandrel as illustrated in Figure 2. The sheets or discs are then solidified into a unitary mass and simultaneously compressed onto the mandrel by any means known in the art. Such means may be a cylinder having a plunger at one end and an opening at the other end just large enough to allow the end of the mandrel to pass therethrough. The cylinder may be jacketed for the purpose of supplying heat to assist in forming the sheets or discs into solidified cylindrical form and gripping same to the mandrel. The mandrel, 1, is also preferably provided with a heating chamber, openings 4, being provided for the entrance and exit of any suitable heating fluid. The material being thermoplastic, same is formed into a cylinder having the mandrel as a core by the pressure on the plunger with the aid of the heat furnished to the cylinder and the mandrel. The solidified mass takes a form such as that shown at 5 in Figure 4. The mass of plastic material is now preferably placed in an air tight compartment and allowed to rest for a desired period to permit diffusion of materials and solvent and other conditioning of the mass. The material is then taken from the compartment and the mandrel set up in any suitable sheeting apparatus.

Apparatus for sheeting is illustrated diagrammatically in Figure 5 wherein a knife 6 is so held as to cut a continuous sheet 7 from the periphery of the cylindrical mass 5 turning in a counter-clockwise direction. The sheet is then carried over a plurality of rollers 8 in a zigzag manner, to permit evaporation of liberated solvent, and is finally wound up on a wheel or roll 9. The long sheets made in this manner are preferably separated into parts or sections in accordance with manufacturing demand, such for instance as interposition between glass plates or other laminations, as shown in Figure 6. These sections may then be dried or partly dried according to demand and may be polished between smooth nickel plates in the usual way if desired. The finished sheets such as 11 may then be composited with layers of glass or any other suitable material such as 10, the result being a unitary laminated structure, such for instance as shown at 12 in Figure 6. The finished product, of course, is adaptable for any of the uses to which laminated structures are put.

The invention, of course, is not limited to the lamination of glass, but obviously includes laminations for any purpose. For the purposes of the claims, therefore, the term glass is intended to include any similar form of lamination.

The uniformity of plastic character obtainable by the method described, and especially by its continuous or non-stop cutting, furnishes a sheet of even thickness and much more adaptable to the requirements of glass making. Incidentally the possible variations in size of such sheets contribute to economy of operation.

Any materials and proportions employed by the glass making art may be used, the invention being essentially one of physical elements to meet physical necessities.

While pyroxylin and its celluloidal compounds are employed as the base and principal composition for the sheets it is of course, understood that related soluble cellulose derivatives and any of their plastics are included in the process. For example, the pyroxylin may be replaced by cellulose acetate and the result of its compounding with appropriate plasticizers such as, triphenyl phosphate, tricresyl phosphate, paraethyltoluolsulphonamid, and triacetin, and volatile converters such as methyl alcohol, ethyl alcohol, benzol, acetone, and ether, may be substituted for the usual pyroxylin plastic. The process also includes a cellulosic plastic sheet made without volatile aids.

The disc form has a particularly beneficial effect on uniformity of structure in the mass because the strata or flaky units of substance or irregularly united parts tend to present their edges to the periphery of the cylinder and thus make for an average smoothness instead of waviness in the sheets. Additionally contributory to this end is the uniformity of stiffness or consistency obtainable. The wrapped cylinder produces a sheet that is uniform in both thickness and consistency. The end edges of the wrapped sheet 23 in Figure 3 are preferably beveled as shown at 24 to eliminate any hard spots or transverse lines in the cut sheet. The novel beveling of the ends is very effective for this purpose. When more than one sheet is applied to the mandrel, the skived or beveled portions overlap. The beveled portions are preferably of gradual slope as shown.

To further aid in avoiding soft and hard spots the mass of rolled cellulosic plastic may be brought to a uniform condition by storage in an air-tight container either before or after formation into a cylinder. Prolonged resting while preferably under pressure and while the mass is still undetached from the mold and spindle, the whole being preferably in a warm state, is very favorable to the production of uniform solidity and solvent diffusion which is desirable in the production of a uniform surface and gauge in the final sheets.

Laminated transparent products made by using these sheets are of superior uniformity and transparency and the union of structural elements is unusually permanent.

In Figures 7, 8, and 9 is shown means for producing novel decorative effects in laminated glass or other structures. In Figure 7 discs 13 are of different colors and each disc may be uniformly colored or mottled or otherwise variegated. The cylinder 14 formed from the discs 13 is sheeted in the same way as the cylinder 5. The sheet 15 thus obtained is made up of a plurality of differently colored striations 16. The sheet 15 may be incorporated between layers of glass or other diaphanous material 17, thus producing a laminated structure capable of producing decorative effects. The striations 16 may be opaque or translucent as desired.

Laminated structures thus produced have many uses, particularly where a high degree of transparency is not required, such as for table-tops, trays, etc. It is thus possible to produce a variety of decorative effects in an object capable of withstanding sharp blows, etc. The superiority of applicant's mandrel made sheet makes it particularly adaptable for such uses, inasmuch as its unusual uniformity and other desirable properties render a laminated structure made therefrom, especially capable of withstanding rough usage.

It is understood that the foregoing detailed description is given merely by way of illustration and that any variations may be made therein within the scope of the claims without departing from the spirit of the invention.

I claim:

1. The process of producing sheets of cellulosic plastics for use in making laminated glass, comprising forming a unitary cylindrical mass of cellulosic plastic material and then cutting a continuous sheet from the periphery of said cylindrical mass while the same is rotating.

2. The process of producing sheets of cellulosic plastics for use in making laminated glass, comprising consolidating a plurality of layers of cellulosic plastic material into a unitary cylindrical mass and then cutting a continuous sheet from the periphery of said cylindrical mass while the same is rotating.

3. The process of producing sheets of cellulosic plastics for use in making laminated glass, comprising consolidating a plurality of sheets of cellulosic plastic material into a unitary cylindrical mass and then cutting a continuous sheet from the periphery of said cylindrical mass while the same is rotating.

4. The process of producing sheets of cellulosic plastics for use in making laminated glass, comprising consolidating a plurality of discs of cellulosic plastic material into a unitary cylindrical mass and then cutting a continuous sheet from the periphery of said cylindrical mass while the same is rotating.

5. The process comprising arranging a plurality of discs of cellulosic plastic face to face, consolidating said discs into a unitary cylindrical mass, then cutting sheets from the periphery of said cylinder.

6. The process comprising assembling a plurality of differently colored discs of cellulosic plastic face to face, consolidating said discs into a unitary cylindrical mass, then cutting sheets from the periphery of said cylinder.

7. The process of producing sheets of cellulosic plastics for use in making laminated glass, comprising forming a unitary cylindrical mass of cellulosic plastic material, storing the same for a suitable period out of contact with the air, and then cutting a continuous sheet from the periphery of said cylindrical mass while the same is rotating.

8. The process comprising arranging a plurality of differently colored discs of cellulosic plastic face to face, consolidating said discs into a unitary cylindrical mass, cutting sheets from the periphery of said cylinder, arranging said sheets between diaphanous laminations, compositing said laminations and said sheets to form reinforced decorative laminated structures.

JAMES F. WALSH.